United States Patent
Kindratenko et al.

(10) Patent No.: US 6,897,863 B2
(45) Date of Patent: May 24, 2005

(54) SYSTEM AND METHOD FOR HIDDEN OBJECT REMOVAL

(75) Inventors: Volodymyr V. Kindratenko, Savoy, IL (US); Robert J. Fenwick, Champaign, IL (US)

(73) Assignee: Caterpillar Inc, Peoria, IL (US)

( * ) Notice: Subject to any disclaimer, the term of this patent is extended or adjusted under 35 U.S.C. 154(b) by 226 days.

(21) Appl. No.: 09/997,030

(22) Filed: Nov. 30, 2001

(65) Prior Publication Data

US 2003/0103048 A1 Jun. 5, 2003

(51) Int. Cl.[7] .............................................. G06T 15/40
(52) U.S. Cl. ........................................................ 345/421
(58) Field of Search .................................. 345/419, 420, 345/421, 422, 424, 428, 423; 382/197, 199, 154, 291

(56) References Cited

U.S. PATENT DOCUMENTS

| | | | |
|---|---|---|---|
| 4,594,673 A | 6/1986 | Holly | |
| 4,710,876 A | * 12/1987 | Cline et al. | 345/423 |
| 4,887,228 A | 12/1989 | Robert | |
| 5,299,302 A | 3/1994 | Fiasconaro | |
| 5,420,970 A | 5/1995 | Steiner et al. | |
| 5,448,686 A | * 9/1995 | Borrel et al. | 345/420 |
| 5,467,409 A | 11/1995 | Yamamoto | |
| 5,574,835 A | 11/1996 | Duluk, Jr. et al. | |
| 5,590,248 A | 12/1996 | Zarge et al. | |
| 5,600,763 A | 2/1997 | Greene et al. | |
| 5,689,577 A | 11/1997 | Arata | |
| 5,751,291 A | 5/1998 | Olsen et al. | |
| 5,870,100 A | 2/1999 | DeFreitas | |
| 5,898,793 A | * 4/1999 | Karron et al. | 382/131 |
| 5,914,721 A | 6/1999 | Lim | |
| 5,949,423 A | 9/1999 | Olsen | |
| 5,974,169 A | 10/1999 | Bachelder | |
| 6,016,153 A | 1/2000 | Gueziec et al. | |
| 6,046,744 A | 4/2000 | Hoppe | |
| 6,088,035 A | 7/2000 | Sudarsky et al. | |
| 6,094,200 A | 7/2000 | Olsen et al. | |
| 6,130,670 A | 10/2000 | Porter | |
| 6,130,673 A | 10/2000 | Pulli et al. | |
| 6,137,497 A | 10/2000 | Strunk et al. | |
| 6,172,679 B1 | 1/2001 | Lim | |
| 6,184,897 B1 | 2/2001 | Gueziec et al. | |

* cited by examiner

Primary Examiner—Mark Zimmerman
Assistant Examiner—Enrique L. Santiago
(74) Attorney, Agent, or Firm—Finnegan, Henderson, Farabow, Garrett & Dunner

(57) ABSTRACT

A computer-implemented method is provided for identifying hidden and visible surfaces on an n-dimensional object. An n-dimensional image of an object is generated, the image including a first plurality of n-dimensional components that define a shape and orientation of the image and a plurality of parts located inside the image. An n-dimensional grid of pixels is superimposed on the image. The pixels are arranged in a lattice structure such that each pixel of the grid corresponds to one of a plurality of vertices of an m-sided cell, wherein each side of the m-sided cell includes at least four vertices. A second plurality of n-dimensional components located on an outer perimeter of the image that abut or overlap at least one side of one m-sided cell in the grid is then identified. The second plurality of n-dimensional components constitute the components of the n-dimensional object that are hidden and need not be repeatedly re-rendered.

27 Claims, 12 Drawing Sheets

| TESTING QUEUE | TESTED POLYGON |
|---|---|
| 17 | 2-5 |
| 18 | 3-4 |
| 19 | 4-3 |
| 20 | 5-2 |
| 21 | 6-1 |
| 22 | 1-7 |
| 23 | 2-6 |
| 24 | 3-5 |

SYSTEM AND METHOD FOR HIDDEN OBJECT REMOVAL

TECHNICAL FIELD

The present invention relates to computer graphics, and more particularly, to a method and apparatus for identifying occluded and visible surfaces of a solid object relative to an arbitrary viewpoint.

BACKGROUND

With the widespread use of computers in all aspects of modern life, there is an increasing demand to improve the human-machine interface through the use of visual information. Advances in graphical software and hardware have already improved the human-machine interface. Interactive graphics such as windowing environments for desk-top computers have also improved the ease of use and interactivity of computers and are common place today. As the price-performance ratio of hardware drops, the use of computer generated graphics and animation will become even more pervasive.

While there are numerous ways to categorize graphics processing, one common approach is to describe an image in terms of the dimensions of the objects that it seeks to represent. For example, a graphics system may represent objects in two dimensions (e.g., having x and y coordinates); in which case the graphics are said to be "two-dimensional", and three dimensions (e.g., having x, y, and z coordinates), in which case the graphics are said to be "three-dimensional" ("3-D").

The increasing ability of modern computers to efficiently handle 2-D and 3-D graphics has resulted in a growing variety of applications for computers, as well as fundamental changes in the interface between computers and their users. The availability of 3-D graphics is also becoming increasingly important to the growth of computer-aided design and computer-aided manufacturing (CAD/CAM), scientific and medical imaging, business applications, and electronic publishing.

One problem associated with the processing and display of 2-D and 3-D graphics is related to the amount of memory required to store the bitmap for even a single image. For example, the system may require 3.75 megabytes (Mb) of random access memory to support a display resolution of 1280×1024 (i.e., number of pixel columns and rows) and 24 bits of color information per pixel. This information, which again represents the image of a single screen, is stored in a portion of the computer's display memory known as a frame buffer.

The demands placed upon the system are further exacerbated by the complexity of the information that often must be processed to render an image. For example, the modeling of a three-dimensional surface is, in itself, a complex task. Surface modeling is performed by the application model and may involve the use of polygon meshes, parametric surfaces, or quadric surfaces. While a curved surface can be represented by a mesh of planar polygons, the "smoothness" of its appearance in the rendered image will depend both upon the resolution of the display and the number of individual polygons that are used to model the surface. The computations associated with high resolution modeling of complex surfaces based upon polygon meshes can be extremely resource intensive.

As intimated above, there is a demand to produce more realistic and interactive images. The term, "real-time," is commonly used to describe interactive and realistic image processing systems. In a "real-time" system, the user should perceive a continuous motion of objects in a scene. In a CAD/CAM graphics application with real-time capabilities, the foreground components and view point should update very quickly and smoothly with minimal delay in response to a user's inputs. To produce such real-time effects, an image rendering system has to generate a new image at a sufficiently high rate such that the user perceives continuous motion of objects in a scene. The rate at which a new image is computed for display is referred to as the "computational" rate or the "computational frame" rate. The computational rate needed to achieve realistic effects can vary depending on how quickly objects move about the scene and how rapidly the viewing perspective changes. For a typical application, a real-time graphics system recomputes a new image at least twelve times a second to generate a series of images that simulate continuous motion. For high-quality animation applications, however, the computational rate must be significantly higher.

As introduced above, conventional graphics systems typically include a frame buffer. To generate an image, the graphic system renders all of the objects in a scene and stores the resulting image in this frame buffer. The system then transfers the rendered image data to a display. In a conventional graphics architecture, the entire frame buffer is erased and the scene is re-rendered to create a next frame's image. In this type of system, every object must be redrawn for each frame because the frame buffer is cleared between frames. Every object therefore is updated at the same rate, regardless of its actual motion in the scene or its importance to the particular application.

This conventional architecture presents several hurdles to producing highly realistic and interactive graphics. First, every object in a scene for a particular frame is rendered with the same priority and at the same update rate. As such, objects in the background that have little impact on the viewed image and are not moving, are re-rendered at the same rate as objects in the foreground that are moving more rapidly and have more surface detail. As a result, processing and memory resources are consumed in re-rendering background objects even though these background objects do not change significantly from frame to frame.

U.S. Pat. No. 5,574,835 to Duluk et al. discloses a method and apparatus for reducing the computations necessary to re-render foreground and background objects. The Duluk et al. reference teaches that the computations for determining whether a polygon lies within the perimeter of an object (i.e., is occulted) can be simplified by approximating the region inside the perimeter of the object with a set of simple shapes (circles, squares, and polyhedrons). However, by relying on approximations, Duluk et al. discloses that polygons lying inside an object and close to the surface, will still be rendered despite the fact that the polygon is actually occulted.

Thus, there is a need to overcome these and other problems of the prior art and to provide an efficient method of reducing the computations required to re-render foreground and background objects. The present invention, as illustrated in the following description, is directed to solving one or more of the problems set forth above.

SUMMARY OF THE INVENTION

In accordance with the present invention, a method for identifying hidden and visible surfaces on an n-dimensional object is disclosed. The method includes the steps of generating an n-dimensional image of an object, wherein the image includes a plurality of n-dimensional components that define a shape and orientation of the image and a plurality of parts located inside the image. An n-dimensional grid of pixels is then superimposed on the image, wherein the pixels are arranged in a lattice structure such that each pixel of the grid corresponds to one of a plurality of vertices of an m-sided cell. Each side of the m-sided cell includes at least four vertices. The present invention identifies a second plurality of n-dimensional components located on the outer perimeter of the image that abut or overlap at least one side of one m-sided cell in the grid.

In accordance with another aspect of the present invention, an apparatus for identifying hidden and visible surfaces on an n-dimensional object is disclosed. The apparatus includes a network device having a memory containing a program that includes several modules. A module is provided for generating an n-dimensional image of an object, wherein the image includes a first plurality of n-dimensional components that define a shape and orientation of the image and a plurality of parts located inside the image. A module is provided for superimposing an n-dimensional grid of pixels on the image, wherein the pixels are arranged in a lattice structure such that each pixel of the grid corresponds to one of a plurality of vertices of an m-sided cell. Each side of the m-sided cell includes at least four vertices. A module is also provided for identifying a second plurality of n-dimensional components located on the outer perimeter of the image that abut or overlap at least one side of one m-sided cell in said grid.

In accordance with yet another aspect of the present invention, a machine-readable storage medium is provided having stored thereon machine executable instructions. The execution of the instructions is adapted to implement a method for identifying hidden and visible surfaces on an n-dimensional object, wherein n is greater than 1. The method includes generating an n-dimensional image of an object, the image including a first plurality of n-dimensional components that define a shape and orientation of the image and a plurality of parts located inside the image. An n-dimensional grid of pixels is then superimposed on the image, the pixels being arranged in a lattice structure such that each pixel of the grid corresponds to one of a plurality of vertices in an m-sided cell, wherein each side of the m-sided cell includes at least four vertices. The present invention identifies a second plurality of n-dimensional components located on an outer perimeter of the image that abut or overlap at least one side of one m-sided cell in said grid.

DETAILED DESCRIPTION

Figure 1:
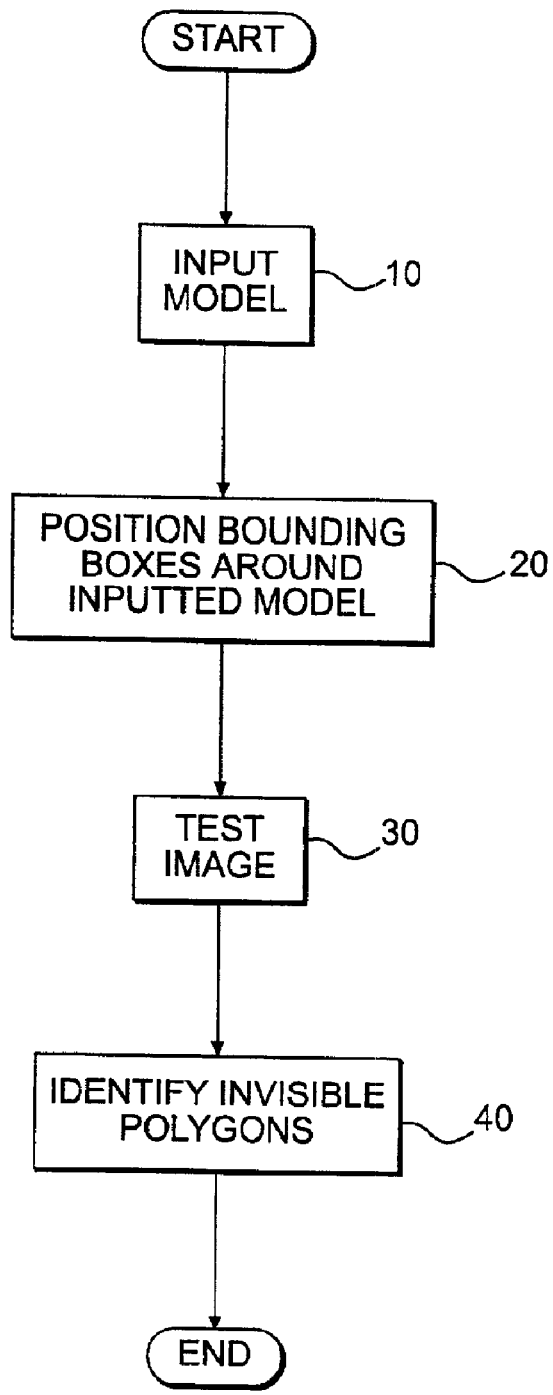
FIG. 1 is a flowchart showing the general operation of the present invention.

In the following detailed description, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that algorithmic changes may be made without departing from the scope of the present invention. The following detailed description is, therefore, not to be taken in a limited sense.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU, and the maintenance of these bits within data structures reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

Figure 2:
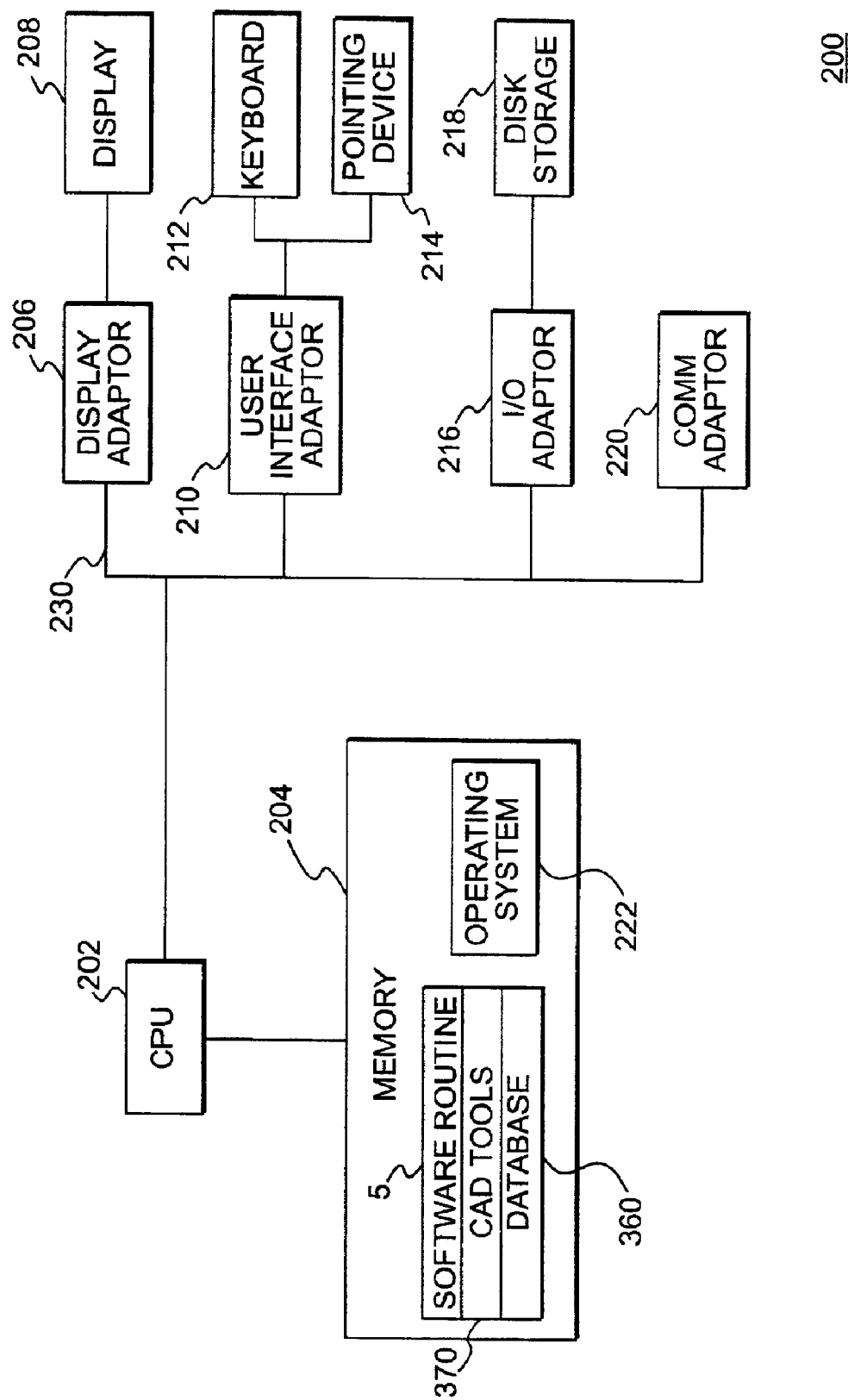
FIG. 2 is a block diagram of a computer for hosting an embodiment of the present invention.

Referring now to the drawings, in which like numerals represent like elements throughout the several figures, the present invention will be described in connection with a three-dimensional object. FIG. 1 shows the general operation of the software routine 5 of one embodiment of the present invention. As shown in FIG. 1, the method of the present invention begins when a user inputs a three-dimensional object (step 10) into memory of a computer system (FIG. 2). The three-dimensional object may alternatively be retrieved directly from computer system memory. Next, in step 20, the system positions a bounding box around the image and then subdivides the bounding box into a plurality of smaller boxes or cells. Processing then flows to step 30 where the system tests the cells inside the bounding box, but outside the coordinates of the inputted image. Once all the cells have been tested, processing flows to step 40 where the system identifies those polygons that are hidden from view and those that are visible.

FIG. 2 shows a detailed block diagram of a computer 200 that may be used to host and operate the present invention. Computer 200 as shown in FIG. 2 is comprised of a central processor unit (CPU) 202, a memory 204, a display adapter 206, a display 208, a user interface (UI) adapter 210, a pointing device 214, a keyboard 212, an input/output (IO) adapter 216, a disk storage unit 218, and a communications adapter 220 for providing a communications function. Memory 204 includes an operating system 222 for operating the device, the software routine 5 of the present invention, CAD tools 370 (FIG. 3), and a database 360 for storing a numerical representation of a plurality of three-dimensional objects. The various components of each computer 200 communicate through a system bus 230 or similar architecture. As shown in FIG. 2, display adaptor 206 is coupled to display 208, user interface adaptor 210 is coupled to pointing device 214 and keyboard 212, I/O adaptor 216 is coupled to disk storage unit 218 and communications adaptor 220 is coupled to a network interface cable for providing connectivity between computer 200 and a Public Switched Telephone Network (PSTN) interface for connectivity to an external computer network. In one embodiment, each computer 200 includes a personal computer. In another embodiment, computer 200 may be a high capacity information server. Computer 200 may have other components, as well, but these are not shown to facilitate description of the unique aspects of this embodiment of the invention. The hardware arrangement of this device, as well as other components discussed in this specification is intentionally shown as general, and is meant to represent a broad variety of architectures, which depend on the particular device used. In one embodiment, the software routine 5 of the present invention is implemented on a Silicon Graphics Incorporated (SGI) platform using Open Inventor™ (ver. 2) as the underlying graphics library.

Figure 3:
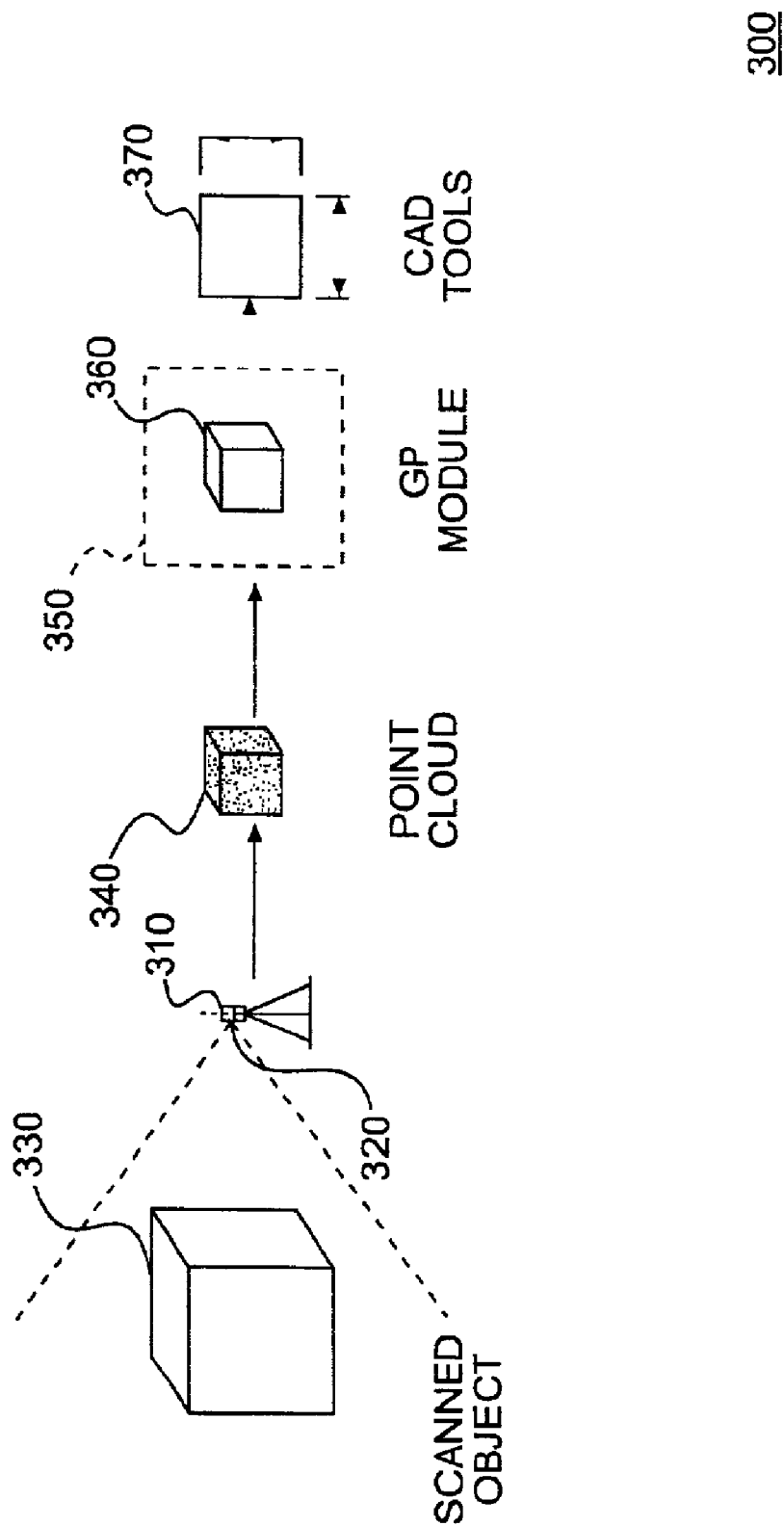
FIG. 3 is block diagram of a sub-system for inputting a three-dimensional object in accordance with the present invention.

FIG. 3 is a block diagram of one embodiment of a system for inputting a three-dimensional object in accordance with the present invention. As shown, the inputting subsystem 300 is comprised of an imaging device 310 and a graphics perception module 350. Referring to FIG. 3, it is shown that imaging device 310 includes a scanning sensor 320 for scanning an object 330 and for sensing the position in three-dimensional space of selected points on the surface of the object 330. Imaging device 310 generates a point cloud 340, which represents the sensed positions of the selected points. Point cloud 340 also represents other attributes of the sensed positions, such as reflectivity, surface color and texture. Graphics Perception (GP) module 350 interacts with imaging device 310 to provide control and targeting functions for scanning sensor 320. In addition, GP module 350 recognizes geometric shapes represented by groups of points in point cloud 340, and it approximates the surface of object 330 into a static set of groups of polygons where each group represents a portion of object 330 model part in the CAD assembly sense. GP module 350 then converts computer-generated images into a database 360 usable by computer-aided design (CAD) tools 370 to render object 330 on a computer display. Other forms of inputting systems may also be used without departing from the spirit and scope of the present invention.

Figure 4:
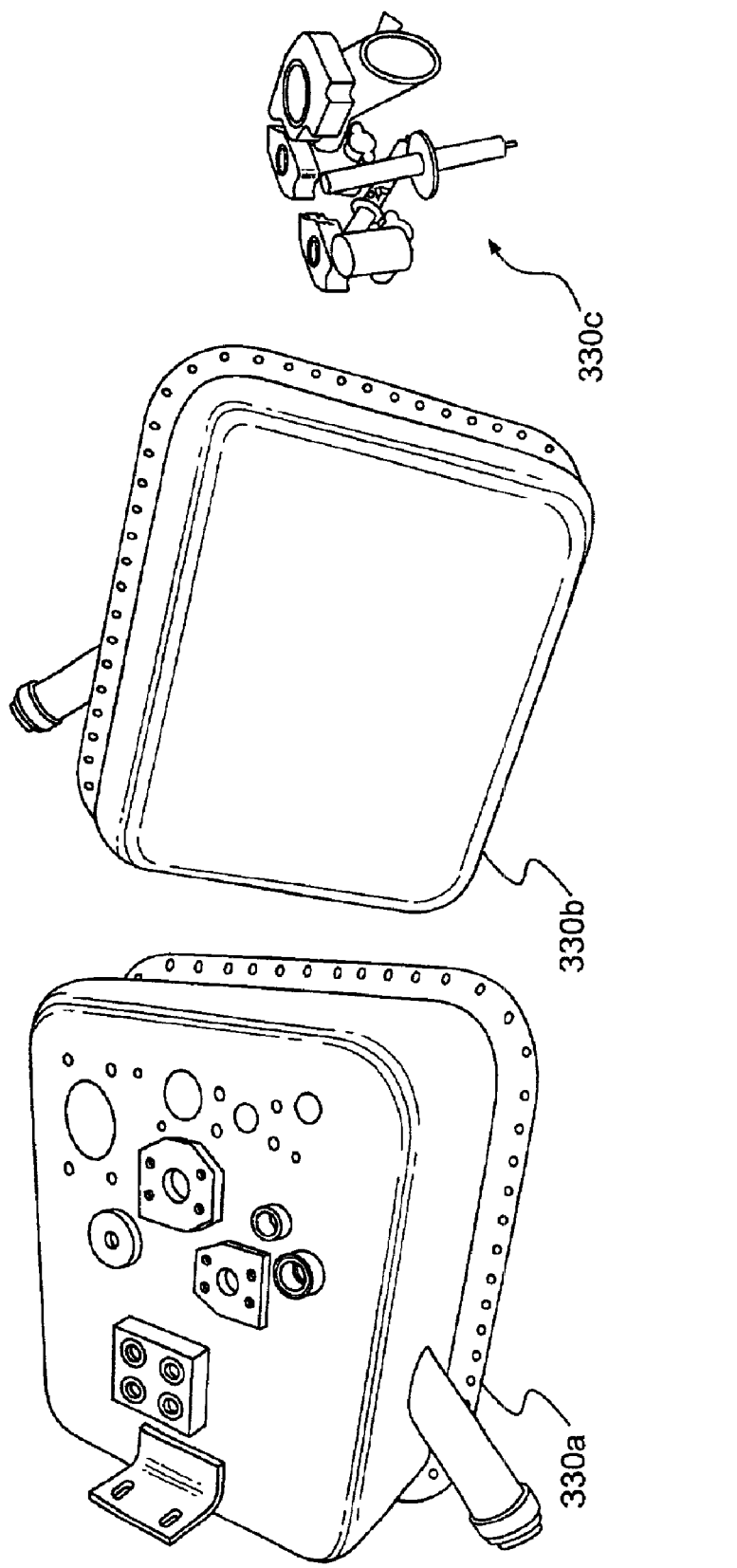
FIG. 4 is an example of an inputted object.

For purposes of illustration, FIG. 4 shows an example of an inputted object 330. In this case, the inputted object is an oil tank consisting of approximately 21 parts. As shown in FIG. 4, inputted object 330 consists of a front surface 330*a*, a back surface 330*b* and a plurality of internal parts 330*c*. When an observer is situated in front of inputted object 330, back surface 330*b* and internal parts 330*c* are occluded from the observer's view. Similarly, when the observer is situated behind the inputted object, front surface 330*a* and internal parts 330*c* are occluded. As shown, depending on the observer's location, front surface 330*a* and back surface 330*b* may alternately be occluded, while internal parts 330*c* are always occluded as long as the observer stays outside the boundary of the union of the polygons. When rendering a three-dimensional representation of image 330 on a two-dimensional display, it is more efficient to limit the computational operations performed to those portions of the image that may change (visible portions) while ignoring those portions of the image that will not change (occluded portions). The present invention identifies the occluded portions of an image by positioning a bounding box around the image, subdividing the bounding box into a plurality of smaller boxes or cells, and testing the cells inside the bounding box, but outside the coordinates of the inputted image to determine the outer boundary of the inputted image. Once all the cells have been tested, the system identifies those polygons that are hidden from view and those that are visible. The polygons hidden from view are associated with occluded portions of the image and need not be updated when rendering a three-dimensional representation of the image.

Figure 5:
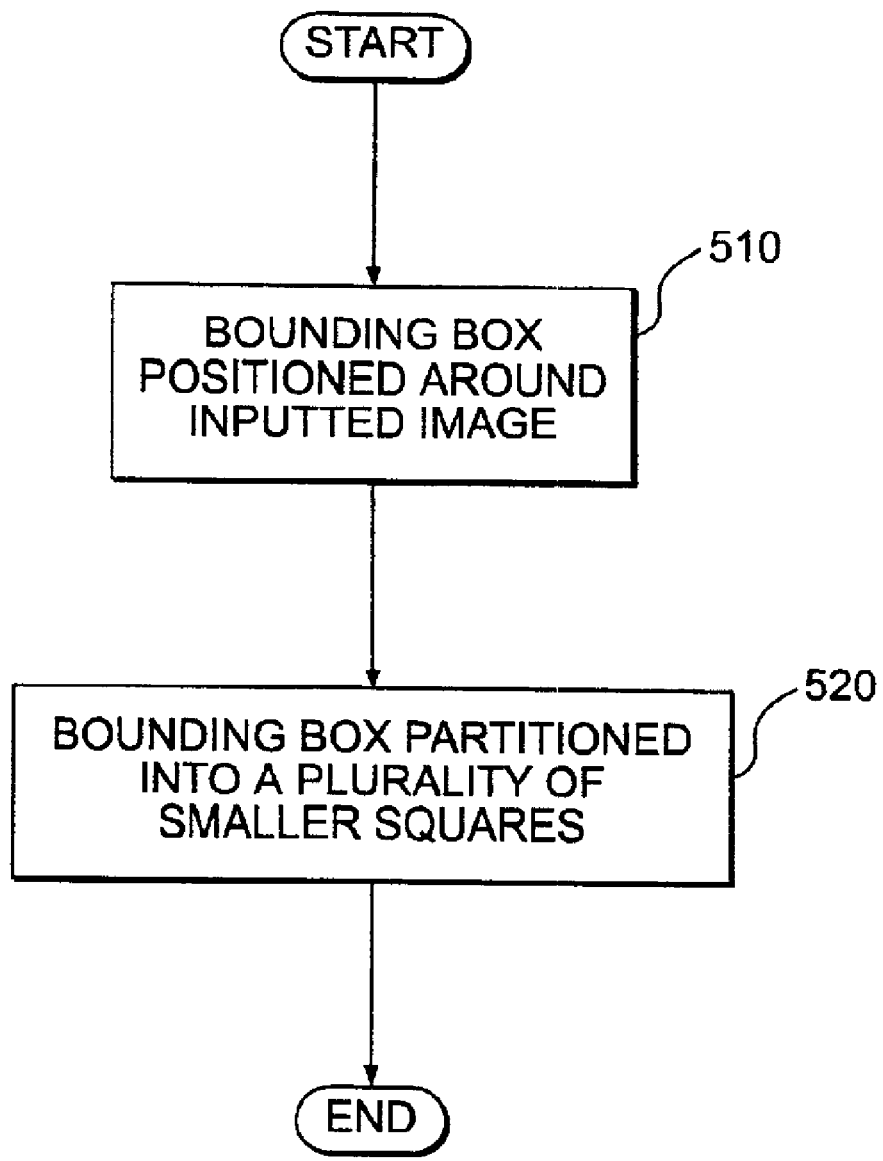
FIG. 5 is a flow diagram of the algorithm for positioning a bounding box around an inputted image in accordance with the present invention.
Figure 6:
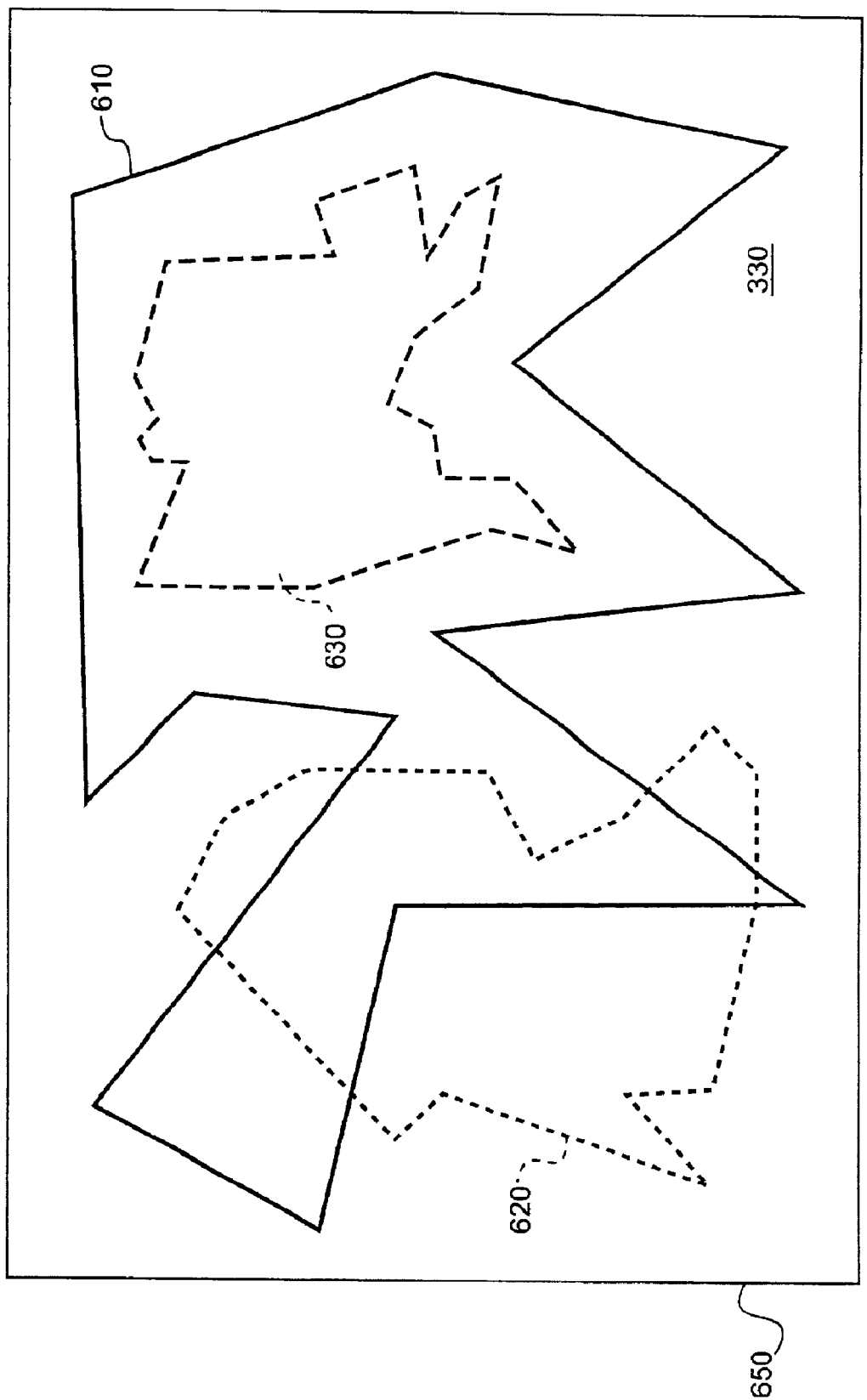
FIG. 6 is a two-dimensional diagram of an inputted three-dimensional image surrounded by a bounding box.

The present invention will first be explained in reference to a two-dimensional (2D) model. Afterwards, the differences associated with implementing routine 5 in a three-dimensional context will then be explained. Referring now to FIG. 5, there is shown a detailed flow diagram of the algorithm for positioning a bounding box around the inputted model (step 20) as depicted in FIG. 1. As shown, the algorithm for positioning a bounding box around the inputted model begins when a bounding box 650 (FIG. 6) is placed around image 330 (step 510). Referring to FIG. 6, it is shown that in this embodiment, bounding box 650 completely envelops image 330 to include a small border of empty space around image 330. As further shown in FIG. 6, image 330 is comprised of a plurality of polygons (610–630). Polygon 610 is represented as a solid line, polygon 620 is represented as a dotted line, and polygon 630 is represented as a dashed line. From FIG. 6 it is clear that polygon 610 is completely visible, polygon 620 is partially occluded by polygon 610 and polygon 630 is completed occluded by polygon 610. After bounding box 650 is positioned, processing flows to step 520 (FIG. 5), where bounding box 650 is partitioned into a plurality of smaller squares or cells.

Figure 7:
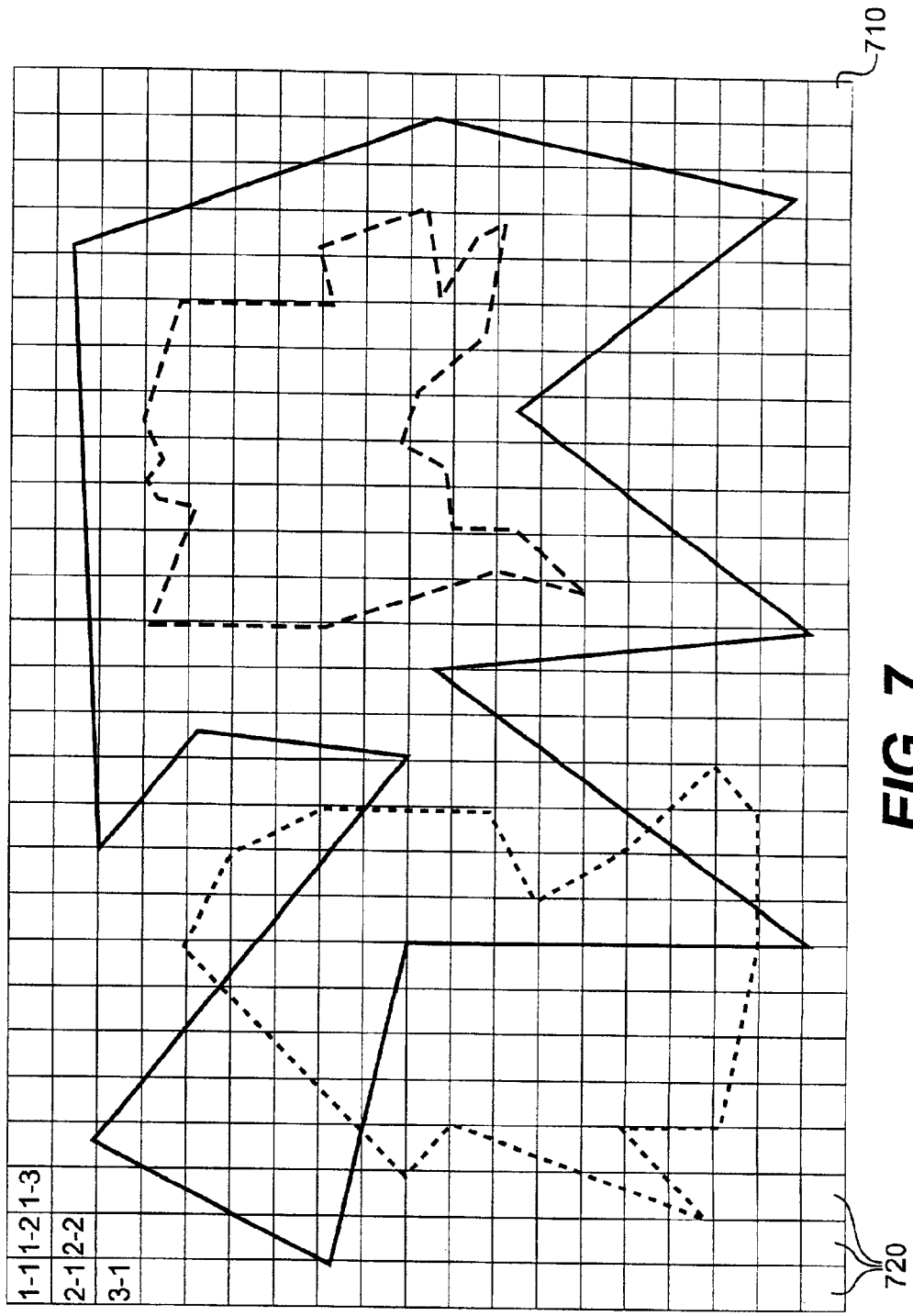
FIG. 7 is a two-dimensional diagram of an inputted three-dimensional image with a lattice superimposed over the image.

Referring to FIG. 7, it is shown that bounding box 650 is subdivided into a 23×19 lattice 710 of cells 720 of equal width and length. Each horizontal/vertical intersection corresponds to a vertex of cell 720. The exact dimension of each cell 720 depends on the size of image 330 and is variable based on user input. Smaller squares 720 allow routine 5 to identify smaller distances between very close parts. However, more squares mean more tests which increases the computational time. Each cell 720 should be appropriately sized such that at least one row of cells 720 may be placed completely around image 330 to create the empty space previously mentioned.

Once bounding box 650 is subdivided into smaller squares or cells, processing flows to step 30 (FIG. 1) where routine 5 tests cells 720 in bounding box 650 to identify the visible and invisible polygons in image 330. In another embodiment, routine 5 may be configured to subdivide bounding box 650 into cells of a first larger size and then, depending on the results of each cell's testing, subdivide the larger cell into a smaller size to more accurately identify the precise dimensions of the visible polygons. For example, when a larger cell is determined to abut or overlap a polygon in image 330, routine 5 could divide the larger cell into smaller cells, test the new cells and thereby determine a more accurate representation of the dimensions of the visible polygon.

Figure 8:
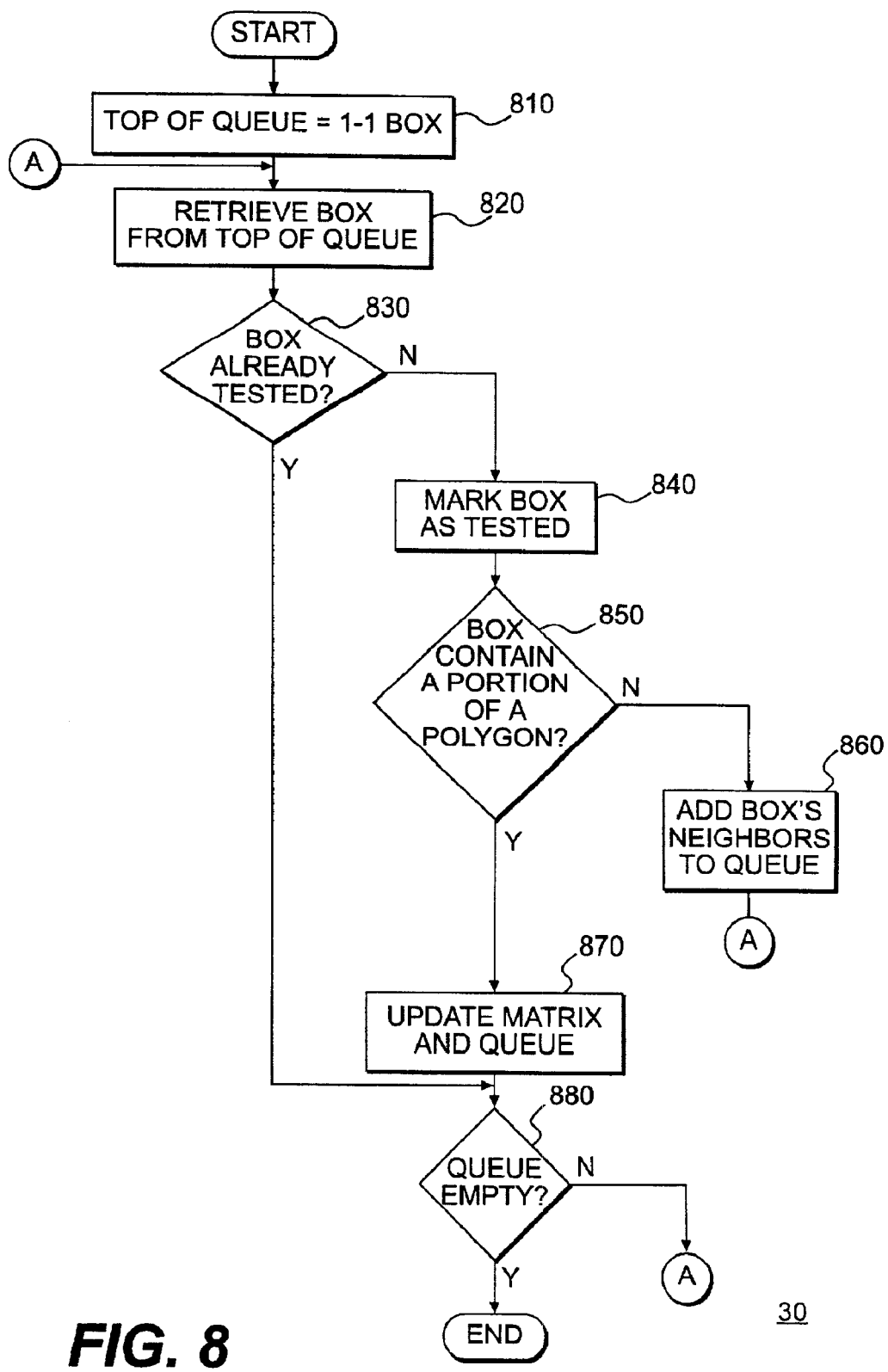
FIG. 8 is a detailed flow diagram of the algorithm for testing cells in accordance with the present invention.
Figure 9:
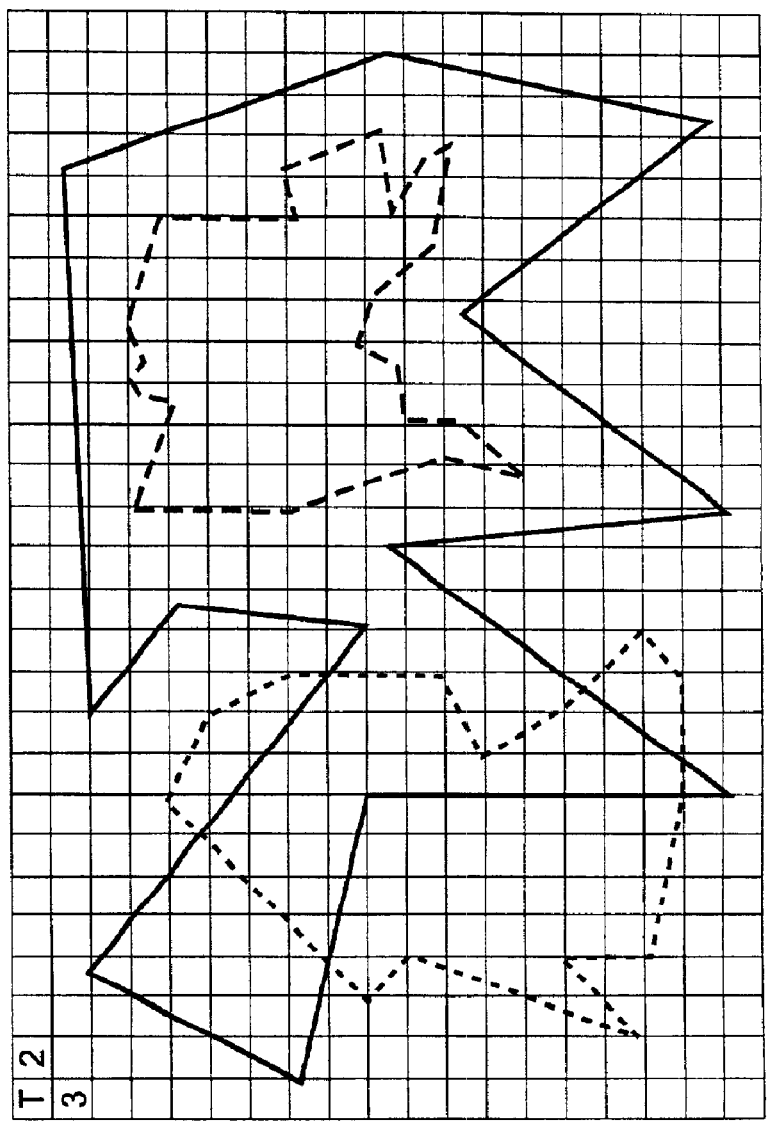
FIG. 9 is a two-dimensional diagram of an inputted three-dimensional image and a testing queue after cell 1—1 has been tested.

FIG. 8 depicts a detailed flowchart of the steps performed by one embodiment of algorithm 5 as it identifies the visible and invisible polygons in image 330. As shown in FIG. 8, processing begins when routine 5 sets the queue pointer to cell 1—1 (step 810). Cell 1—1, as shown in FIG. 7, is the uppermost, leftmost cell in lattice 710. Routine 5 begins processing lattice 710 at cell 1—1 because that square does not contain any portion of image 330. In this way, routine 5 is able to propagate throughout lattice 710 to identify the portions of image 330 that are visible from outside of the image. Since the empty space around image 330 contains at least one row of cells, it is unlikely that cell 1—1 will ever contain a portion of image 330. In one embodiment, the cell at the top of the queue is always cell 1—1, however any cell in lattice 710 may be the first cell tested, when routine 5 is initiated, as long as it does not contain any portion of image 330. Processing next flows to step 820 where routine 5 retrieves the cell located at the top of a testing queue (FIG. 9). Next, routine 5 determines whether the cell has been previously tested (step 830). If the cell has already been tested, processing flows to step 880. If cell 720 has not been tested, processing flows to step 840 and the current cell is marked as "Tested". Next, routine 5 determines whether the current cell contains a portion of an external polygon. In other words, has a visible portion of image 330 been found? In one embodiment of the present system, an external polygon is found when the coordinates of the vertices of the current cell indicate that at least one side of the cell intersects or overlaps at least one side of an external polygon associated with image 330. Referring to FIG. 7, it is shown that cell 2–4 (vertices located at positions 1–3, 2–3 and 2–4) contains one side (vertices 2–3 and 2–4) that intersects polygon 610. As a result of the intersection, polygon 610 is an external or visible polygon. If an external polygon has been found, routine 5 updates lattice 710 and the testing queue (step 870), and processing flows to step 880. In step 880, routine 5 determines whether the testing queue is empty. If there are more cells in the queue, processing flows to step 820 where routine 5 retrieves the cell located at the top of the testing queue. If the testing queue is empty, processing terminates. If an external polygon has not been found in the current cell (step 850), routine 5 adds the current cell's nearest neighbors to the testing queue (in one embodiment, up to a maximum of four cells may be added to the testing queue) (step 860). Once the neighbors have been added to the queue, routine 5 retrieves the next cell from the testing queue for processing (step 820).

Figure 10:
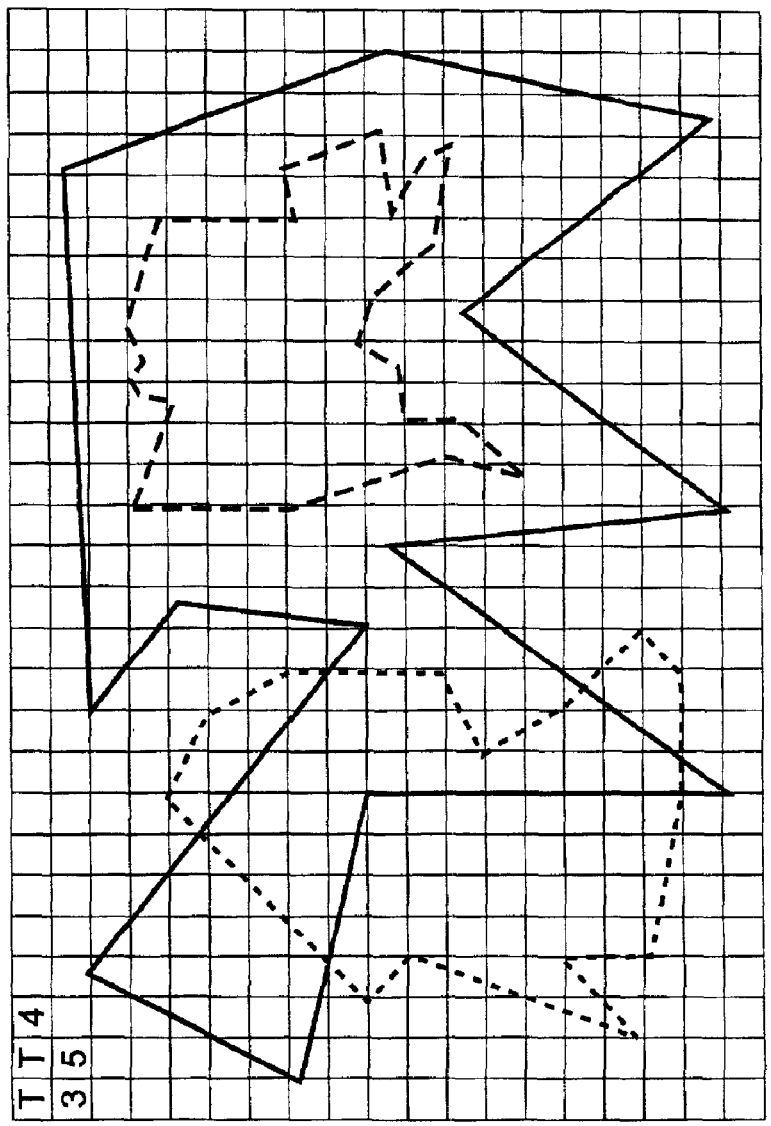
FIG. 10 is a two-dimensional diagram of an inputted three-dimensional image and a testing queue after cell 1–2 has been tested.
Figure 11:
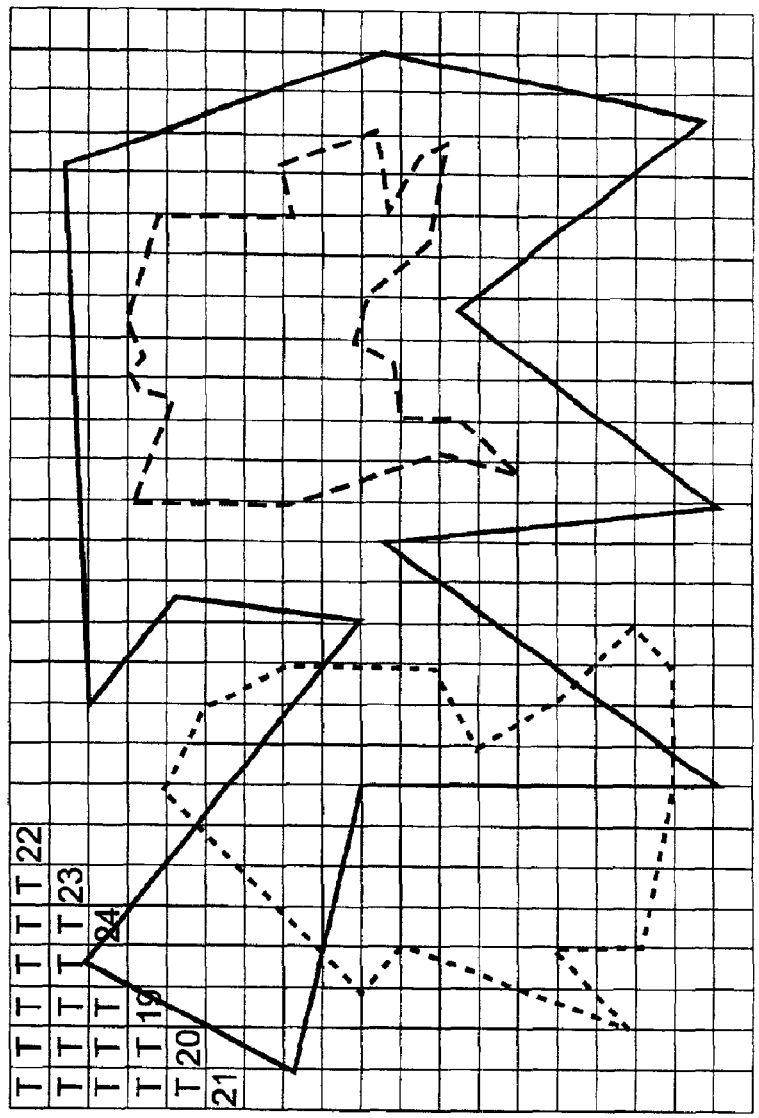
FIG. 11 is a two-dimensional diagram of an inputted three-dimensional image and a testing queue after cell 3–4 has been tested.

A depiction of lattice 710 and the testing queue is shown in FIGS. 9–11 to further illustrate the operation of routine 5. Referring first to FIG. 9, it is shown that once cell 1—1 has been tested, a notation is placed in the cell (or in a memory location representative of the cell) indicating that the cell has been tested (step 840 of FIG. 8). Since cell 1—1 did not contain a portion of a polygon, the two nearest neighbors to cell 1—1 are added to the testing queue (step 860). Processing then flows to step 820, and routine 5 retrieves another cell from the top of the testing queue. In this case, the next cell is cell 1–2.

Referring now to FIG. 10, it is shown that once cell 1–2 has been tested, a notation is placed in the cell (or in a memory location representative of the cell) indicating that the cell has been tested (step 840). Since cell 1–2 did not contain a portion of a polygon, the two nearest neighbors to cell 1–2 are added to the testing queue. Processing then flows to step 820 (FIG. 8), and routine 5 retrieves another cell from the top of the testing queue.

FIG. 11 provides a depiction of lattice 710 and the testing queue when a cell 720 containing a portion of a polygon is tested. As shown in FIG. 11, when cell 3–4 is tested, it is determined that the cell contains a portion of polygon 610 (step 850). As shown in FIG. 11, lattice 710 is updated to reflect the results of the test and the testing lattice is updated to reflect the fact that a portion of polygon 610 has been located. Since a portion of a polygon was located in cell 3–4, routine 5 does not add the cell's neighbors to the testing queue. In effect, routine 5 limits its search to portions outside of image 330.

Once all of the cells inside lattice 710, but outside of image 330 have been tested, processing flows to step 40 (FIG. 1) to identify all invisible polygons. Invisible polygons are those polygons that are part of image 330, but have not been previously identified as abutting or overlapping a cell 720. In essence, invisible polygons make up part of image 330, but they are not visible from the outside of image 330. Referring back to FIG. 6, it can be seen that from the outside of image 330, polygon 610 is visible, polygon 620 is partially visible and polygon 630 invisible. Once the invisible polygons are identified, they can be removed from a rendering algorithm, thereby conserving valuable processing resources when a two-dimensional representation of a three-dimensional image is rendered on a display screen. In another embodiment, routine 5 may be configured to simultaneously begin testing cells at a plurality of locations in lattice 710 and thereby reduce the amount of time required to test cells in lattice 710 by an order of magnitude. For example, routine 5 could simultaneously begin testing at two or more cells (e.g., 1—1, 19–1, 1–27, and 19–27), as shown in FIG. 7 to therefore identify visible and hidden polygons at a much quicker rate.

Figure 12:
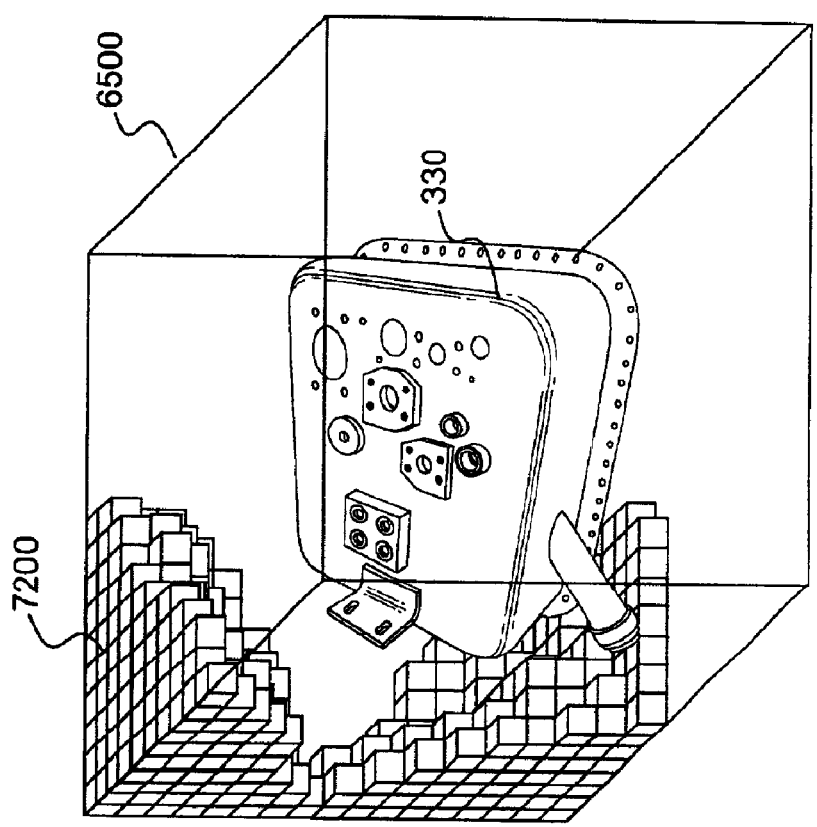
FIG. 12 is a three-dimensional representation of a bounding box, image, and cell in accordance with one embodiment of the present invention.

Routine 5 can be similarly implemented in the context of a three-dimensional model. Referring now to FIG. 12, it is shown that instead of a two-dimensional bounding box 650 constructed around a two-dimensional representation of image 330, there would be a three-dimensional bounding box 6500 built around a three-dimensional representation of image 330. Bounding box 6500 would accordingly include a stacked series of lattices. Intersections in the lattice correspond to vertexes of smaller cells 7200 of equal length, width and height. Routine 5 would begin testing the polyhedrons in bounding box 6500 starting with the cell located at 1—1—1 as depicted in FIG. 9. Testing would proceed as depicted in FIGS. 9–11 with routine 5 testing cells, updating the testing queue, and adding up to 8 of the cell's closest neighbors (provided the polyhedron does not contain a portion of an external polygon) to the testing queue for testing.

From the foregoing description, it will be appreciated that the present invention provides an efficient system and method for reducing the computations necessary to re-render foreground and background objects. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIGS. 1, 5 and 8. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and, therefore, no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

Industrial Applicability

The present invention provides a method of reducing the computations required to re-render foreground and background objects. The present invention employs a hidden surface routine capable of high speed real time operation for distinguishing the hidden and visible surfaces of a solid, three-dimensional object. In operation, the system and method retrieves an image from memory, places an imaginary grid around the image, and then subdivides the imaginary grid into smaller polyhedrons. The hidden surface routine then tests each smaller polyhedron to determine whether a portion of the image lies within the polyhedron. When all the polyhedrons inside the imaginary grid and outside the image have been tested, the hidden surface algorithm is able to identify those polygons that are hidden from view and those that are visible. Polygons that are obscured by other polygons lying closer to the observer's viewpoint are removed and do not need to be rendered by an image renderer.

The system and method for hidden objects removal according to the present invention finds use in the efficient display of complex three-dimensional images in, for example, the manufacturing industry. The system has wide application in a variety of other computer graphic systems including automated manufacturing lines, where images of components are analyzed to evaluate compliance with design requirements and quality assurance.

Thus, the present invention provides a method for reducing the complexity of a CAD model by removing objects not visible to the observer and relieving the processor from the overhead normally associated with processing the hidden objects. The system accomplishes the hidden object removal in a relatively uncomplicated manner and without the need for additional expensive components.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A computer-implemented method for identifying hidden and visible surfaces on an n-dimensional object, wherein n is greater than 1, said method comprising:

generating an n-dimensional image of an object, said image including a first plurality of n-dimensional components that define a shape and orientation of the image and a plurality of parts located inside the image;

superimposing an n-dimensional grid of pixels on said image, said pixels arranged in a lattice structure such that each pixel of said grid corresponds to one of a plurality of vertices of an m-sided cell, wherein each side of said m-sided cell includes at least four vertices; and identifying a second plurality of n-dimensional components located on an outer perimeter of said image that abut or overlap at least one side of one m-sided cell in said grid.

2. The method of claim 1, wherein m is two times n.

3. The method of claim 1, further including the step of rendering an n-dimensional image including the second plurality of n-dimensional components.

4. The method of claim 1, wherein said identifying further includes:

starting at a predetermined location inside the grid and outside the image;

identifying a set of vertices corresponding to the sides of an untested m-sided cell;

testing each side of the untested cell to determine when an n-dimensional component abuts or overlaps at least one side of the m-sided cell;

storing an identifier of an n-dimensional component when the n-dimensional component abuts or overlaps at least one side of said m-sided cell; and repeating the identifying, testing, and storing steps for every m-sided cell located inside the grid, excluding cells inside the image.

5. The method of claim 1, wherein said identifying further includes:

identifying a location where the image abuts or overlaps at least one side of an m-sided cell;

storing an identifier of each n-dimensional component in the image associated with the location; and repeating the identifying, testing, and storing steps for every location where the image abuts or overlaps at least one side of an m-sided cell.

6. The method of claim 4, wherein said storing further includes:

identifying a plurality of m-sided cells adjacent to said m-sided cell when the n-dimensional component does not abut or overlap at least one side of said m-sided cell; and for each of said plurality of adjacent m-sided cells, storing an identifier of an n-dimensional component when the n-dimensional component abuts or overlaps at least one side of said adjacent m-sided cells.

7. The method of claim 1, wherein spacing between successive pixels is a user inputted value.

8. The method of claim 1, wherein said n-dimensional grid is comprised of a plurality of m-sided cells.

9. The method of claim 8, wherein an outer boundary of said grid is separated from the outer perimeter of said image by at least one row of m-sided cells.

10. An apparatus for identifying hidden and visible surfaces on an n-dimensional object, wherein n is greater than 1, said apparatus comprising:

a network device having a memory containing a program that further includes:

a module for generating an n-dimensional image of an object, said image including a first plurality of n-dimensional components that define a shape and orientation of the image and a plurality of parts located inside the image;

a module for superimposing an n-dimensional grid of pixels on said image, said pixels arranged in a lattice structure such that each pixel of said grid corresponds to one of a plurality of vertices of an m-sided cell, wherein each side of said m-sided cell includes of at least four vertices; and a module for identifying a second plurality of n-dimensional components located on an outer perimeter of said image that abut or overlap at least one side of one m-sided cell in said grid.

11. The apparatus of claim 10, wherein m is two times n.

12. The apparatus of claim 10, further including a module for rendering an n-dimensional image including the second plurality of n-dimensional components.

13. The apparatus of claim 10, wherein said module for identifying further includes the capability to:

start at a predetermined location inside the grid and outside the image;

identify a set of vertices corresponding to the sides of an untested m-sided cell;

test each side of the untested cell to determine when an n-dimensional component abuts or overlaps at least one side of said m-sided cell;

store an identifier of an n-dimensional component when the n-dimensional component abuts or overlaps at least one side of said m-sided cell; and repeat the identifying, testing and storing steps for every m-sided cell located inside the grid, excluding cells inside the image.

14. The apparatus of claim 10, wherein said module for identifying further includes the capability to:

identify a location where the image abuts or overlaps at least one side of an m-sided cell;

store an identifier of each n-dimensional component in the image associated with the location; and repeat the identifying and storing steps for every location where the image abuts or overlaps at least one side of an m-sided cell.

15. The apparatus of claim 13, wherein said module for storing further includes the capability to:

identify a plurality of m-sided cells adjacent to said m-sided cell when the n-dimensional component does not abut or overlap at least one side of said m-sided cell;

for each of said plurality of adjacent m-sided cells, store an identifier of an n-dimensional component when the n-dimensional component abuts or overlaps at least one side of said adjacent m-sided cells.

16. The apparatus of claim 10, further including the capability for a user to modify spacing between successive pixels.

17. The apparatus of claim 10, wherein said n-dimensional grid includes a plurality of m-sided cells.

18. The apparatus of claim 17, wherein an outer boundary of said grid is separated from the outer perimeter of said image by at least one row of m-sided cells.

19. A machine-readable storage medium having stored thereon machine executable instructions, the execution of said instructions adapted to implement a method for identifying hidden and visible surfaces on an n-dimensional object, wherein n is greater than 1, said method comprising:

generating an n-dimensional image of an object, said image including a first plurality of n-dimensional components that define a shape and orientation of the image and a plurality of parts located inside the image;

superimposing an n-dimensional grid of pixels on said image, said pixels arranged in a lattice structure such that each pixel of said grid corresponds to one of a plurality of vertices in an m-sided cell, wherein each side of said m-sided cell includes at least four vertices; and identifying a second plurality of n-dimensional components located on an outer perimeter of said image that abut or overlap at least one side of one m-sided cell in said grid.

20. The machine-readable storage medium of claim 19, wherein m is two times n.

21. The machine-readable storage medium of claim 19, further including the step of rendering an n-dimensional image of the second plurality of n-dimensional components.

22. The machine-readable storage medium of claim 19, wherein said identifying further includes:

starting at a predetermined location inside the grid and outside the image;

identifying a set of vertices corresponding to the sides of an untested m-sided cell;

testing each side of the untested cell to determine whether an n-dimensional component abuts or overlaps at least one side of said m-sided cell;

storing an identifier of an n-dimensional component when the n-dimensional component abuts or overlaps at least one side of said m-sided cell; and repeating the identifying, testing and storing steps for every m-sided cell located inside the grid, excluding cells inside the image.

23. The machine-readable storage medium of claim 19, wherein said identifying further includes:

identifying a location where the image abuts or overlaps at least one side of an m-sided cell;

storing an identifier of each n-dimensional component in the image associated with the location; and repeating the identifying and storing steps for every location where the image abuts or overlaps at least one side of an m-sided cell.

24. The machine-readable storage medium of claim 22, wherein said storing further includes:

identifying a plurality of m-sided cells adjacent to said m-sided cell when the n-dimensional component does not abut or overlap at least one side of said m-sided cell; and for each of said plurality of adjacent m-sided cells, storing an identifier of an n-dimensional component when the n-dimensional component abuts or overlaps at least one side of said adjacent m-sided cells.

25. The machine-readable storage medium of claim 19, wherein spacing between successive pixels is a user inputted value.

26. The machine-readable storage medium of claim 19, wherein said n-dimensional grid includes a plurality of m-sided cells.

27. The machine-readable storage medium of claim 26, wherein an outer boundary of said grid is separated from the outer perimeter of said image by at least one row of m-sided cells.

* * * * *

UNITED STATES PATENT AND TRADEMARK OFFICE
CERTIFICATE OF CORRECTION

PATENT NO.    : 6,897,863 B2
DATED         : May 24, 2005
INVENTOR(S)   : Volodymyr V. Kindratenko et al.

It is certified that error appears in the above-identified patent and that said Letters Patent is hereby corrected as shown below:

Column 10,
Line 44, delete "hidden" and insert -- occluded --.
Line 56, delete "and".
Line 60, delete "grid." and insert -- grid; and
identifying at least one occluded portion of the image based on the identified second plurality of n-dimensional components. --.
Line 64, after "components" delete "." and insert -- and excluding the at least one occluded portion. --.
Line 65, delete "The method of claim 1, wherein said identifying further includes:" and insert -- A computer-implemented method for identifying hidden and visible surfaces on an n-dimensional object, wherein n is greater than 1, said method comprising:
generating an n-dimensional image of an object, said image including a first plurality of n-dimensional components that define a shape and orientation of the image and a plurality
    of parts located inside the image;
  superimposing an n-dimensional grid of pixels on said image, said pixels arranged in a
    lattice structure such that each pixel of said grid corresponds to one of a plurality of
    vertices of an m-sided cell, wherein each side of said m-sided cell includes at least
    four vertices; and
  identifying a second plurality of n-dimensional components located on an outer perimeter
    of said image that abut or overlap at least one side of one m-sided cell in said grid,
    wherein said identifying includes: --.

Column 11,
Line 38, delete "hidden" and insert -- occluded --.
Line 53, delete "and".
Line 57, delete "grid." and insert -- grid; and
a module identifying at least one occluded portion of the image based on the identified second plurality of n-dimension components. --.
Line 61, delete "components." and insert -- components and excluding the at least one occluded portion. --.

UNITED STATES PATENT AND TRADEMARK OFFICE
CERTIFICATE OF CORRECTION

PATENT NO. : 6,897,863 B2
DATED : May 24, 2005
INVENTOR(S) : Volodymyr V. Kindratenko et al.

It is certified that error appears in the above-identified patent and that said Letters Patent is hereby corrected as shown below:

Column 11 (cont'd),
Line 62, delete "The apparatus of claim 10, wherein said module for identifying further includes the capability to:" and insert -- An apparatus for identifying hidden and visible surfaces on an n-dimensional object, wherein n is greater than 1, said apparatus comprising:
   a network device having a memory containing a program that further includes:
   a module for generating an n-dimensional image of an object said image including a first plurality of n-dimensional components that define a shape and orientation of the image
      and a plurality of parts located inside that image;
   a module for superimposing an n-dimensional grid of pixels on said image, said pixels arranged in a lattice structure such that each pixel of said grid corresponds to one of a
      plurality of vertices of an m-sided cell, wherein each side of said m-sided cell includes of at least four vertices; and
   a module for identifying a second plurality of n-dimensional components located on
      an outer perimeter of said image that abut or overlap at least one side of one m-sided cell in said grid, wherein said module for identifying further includes the capability to: --.

Column 12,
Line 53, delete "and".
Line 57, delete "grid." and insert -- grid; and
identifying at least one hidden portion of the image based on the identified second plurality of n-dimensional components. --.
Line 62, delete "components" and insert -- components, excluding the at least one hidden portion. --.
Line 63, delete "The" and insert -- A --.

UNITED STATES PATENT AND TRADEMARK OFFICE
CERTIFICATE OF CORRECTION

PATENT NO. : 6,897,863 B2
DATED : May 24, 2005
INVENTOR(S) : Volodymyr V. Kindratenko et al.

It is certified that error appears in the above-identified patent and that said Letters Patent is hereby corrected as shown below:

Column 12 (cont'd),
Line 63, delete "of claim 19, wherein said identifying further includes:" and insert
-- having stored thereon machine executable instructions, the execution of said instructions adapted to implement a method for identifying hidden and visible surfaces on an n-dimensional object, wherein n is greater that 1, said method comprising:
generating an n-dimensional image of an object, said image including a first plurality of
    n-dimensional components that define a shape and orientation of the image and a plurality of parts located inside the image;
superimposing an n-dimensional grid of pixels on said image, said pixels arranged in a
    lattice structure such that each pixel of said grid corresponds to one of a plurality
    of vertices in an m-sided cell, wherein each said of said m-sided cell includes at
    least four vertices; and
 identifying a second plurality of n-dimensional components located on an outer perimeter
    of said image that abut or overlap at least one side of one m-sided cell in said grid,
    wherein said identifying includes: --.

Signed and Sealed this

Thirteenth Day of December, 2005

JON W. DUDAS
*Director of the United States Patent and Trademark Office*